(12) United States Patent
Johnston et al.

(10) Patent No.: US 7,081,811 B2
(45) Date of Patent: Jul. 25, 2006

(54) MULTIPLE SENSOR HEAT ALARM

(76) Inventors: John Johnston, 1556 Cypress Dr., Jupiter, FL (US) 33469; Robert J. Dye, 1427 SW. Duckskin Trail, Stuart, FL (US) 34997; Steven H. DaPonte, 16718 Alexander Run, Jupiter, FL (US) 33478

( * ) Notice: Subject to any disclaimer, the term of this patent is extended or adjusted under 35 U.S.C. 154(b) by 77 days.

(21) Appl. No.: 10/648,653

(22) Filed: Aug. 22, 2003

(65) Prior Publication Data

US 2005/0040942 A1   Feb. 24, 2005

(51) Int. Cl.
*B60Q 1/00*   (2006.01)
(52) U.S. Cl. .............. 340/449; 340/441; 340/455; 340/438; 340/539.11; 340/539.22; 340/539.27; 340/539.3; 340/573.1
(58) Field of Classification Search ............. 340/449, 340/441, 455, 438, 539.11, 539.22, 539.27, 340/539.3, 573.1
See application file for complete search history.

(56) References Cited

U.S. PATENT DOCUMENTS

| | | | |
|---|---|---|---|
| 4,183,177 A | 1/1980 | Kurdziel | |
| 4,663,626 A | 5/1987 | Smith | |
| 5,259,814 A * | 11/1993 | Weissbrich et al. | 454/75 |
| 5,369,911 A | 12/1994 | Fortunato | |
| 5,659,289 A | 8/1997 | Zonkoski et al. | |
| 5,793,284 A | 8/1998 | Teague | |
| 5,793,291 A | 8/1998 | Thornton | |
| 6,037,749 A * | 3/2000 | Parsonage | 320/132 |
| 6,104,293 A * | 8/2000 | Rossi | 340/573.1 |
| 6,166,627 A * | 12/2000 | Reeley | 340/426.25 |
| 6,252,406 B1 * | 6/2001 | Tegge et al. | 324/427 |
| 6,496,106 B1 * | 12/2002 | Rodriguez | 340/425.5 |
| 6,639,512 B1 * | 10/2003 | Lee et al. | 340/425.5 |
| 2002/0109583 A1 * | 8/2002 | Losey | 340/5.72 |
| 2002/0145516 A1 * | 10/2002 | Moskowitz et al. | 340/522 |
| 2002/0161501 A1 * | 10/2002 | Dulin et al. | 701/45 |
| 2003/0098784 A1 * | 5/2003 | Van Bosch et al. | 340/425.5 |
| 2003/0222775 A1 * | 12/2003 | Rackham et al. | 340/457 |

* cited by examiner

*Primary Examiner*—Daryl C Pope
(74) *Attorney, Agent, or Firm*—McHale & Slavin P.A.

(57) ABSTRACT

A multiple heat sensor alarm system for use in a vehicle to indicate that the interior temperature is above a preset limit has a control head with a microprocessor. Heat sensors or thermometers are placed at different points in the vehicle and connected to the microprocessor. The processor averages all sensor inputs and compares the average to the preset alarm temperature limit. When the limit is exceeded the microprocessor issues an alarm command. The system is connected to the vehicle components and the alarm command operates the horn, lights, windows, doors, or engine. The system may correspond with a portable beeper/pager. The microprocessor has a time delay mode on initial start-up. The system also monitors the battery power of the vehicle and indicates a low power situation.

21 Claims, 1 Drawing Sheet

MULTIPLE SENSOR HEAT ALARM

FIELD OF THE INVENTION

Figure 1:
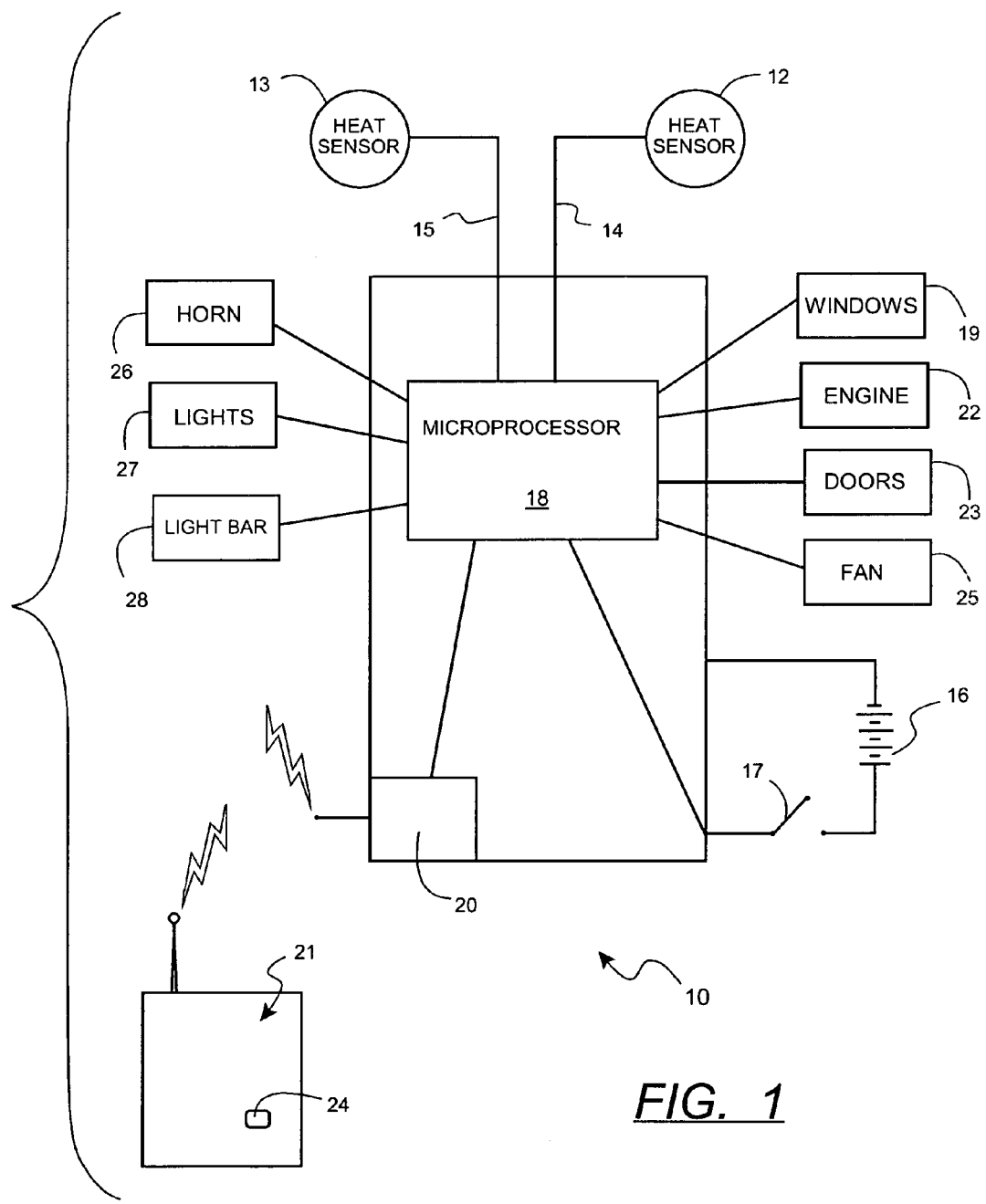

This invention relates to heat alarms to protect occupants of a vehicle or other enclosed space from prolonged high ambient temperature.

BACKGROUND OF THE INVENTION

Law Enforcement agencies, including private/government agencies, typically have a special detachment of employees that are assigned a trained dog. These detachments are referred to as K-9 units. The care and maintenance of the K-9 is of primary importance to the officer and the department.

As part of the special equipment, the K-9 unit has customized vehicles for transporting the dog along with his handler. However, there are times during the work day when it is necessary for the officer to leave the dog in the vehicle and conduct business alone. Usually, the vehicle is locked and ventilation is limited to prevent unintended contact between the dog and the general public. During the summer months or other times of higher than normal temperatures, especially sunny days, the interior of the vehicle may become too hot for the health of the dog.

There are temperature sensors on the market for use in K-9 vehicles. The units have a temperature sensor to be placed near or in the K 9 containment area and connected by wire to a display/control head mounted in the instrument panel.

The conventional sensors do not always give a true reading of the ambient temperature in the vehicle and can give false warnings. The placement of the sensor causes the inconsistent readings either because of the location of the vehicle relative to the sun or the surrounding structures. For example, if the sensor is in direct sunlight it will read a higher temperature than if it were in the shade.

Known prior art employ backup temperature sensors that are manufactured at a fixed threshold that is inherent to the materials used when manufactured. They are not intelligent or settable. No reading can come from such a sensor nor can the threshold be altered. Another commercial temperature sensor has a second sensor located in the control head. This second sensor serves as a back-up or over-ride and may be set at a higher alarm temperature. There is no read-out for the over-ride and it is located in or on the dash of the vehicle which is one of the hottest locations. While there are two temperature sensors, each can cause a false alarm because of their respective locations.

U.S. Pat. No. 5,793,284 discloses a temperature sensor and a remote paging receiver and transmitter to notify an absent operator when vehicle temperature is outside a predetermined temperature range.

U.S. Pat. No. 5,793,291 discloses a motion sensor and a temperature sensor with preset extremes. The device will transmit an alarm signal such as the vehicle horn when the extremes are exceeded.

U.S. Pat. No. 5,659,289 discloses a canine alert system which operates a pager or beeper is based on temperature sensing, air conditioning failure and engine stall.

U.S. Pat. No. 4,663,626 discloses a device for operating a vehicle power assist member from outside the vehicle.

U.S. Pat. No. 4,183,177 and U.S. Pat. No. 5,369,911 disclose a remote controlled auto door opening system for unlocking and unlatching a vehicle door.

SUMMARY OF THE PRESENT INVENTION

A multiple heat sensor alarm system for use in a vehicle to indicate that the interior temperature is above a preset limit and has a control head with a microprocessor. Heat sensors are placed at different points in the vehicle and connected to the microprocessor which averages the sensor inputs. When the limit is exceeded the microprocessor issues an alarm command. The system is connected to the vehicle components and the alarm command operates the horn, lights (e.g. police emergency lights), sirens, fans, windows, or engine. The system may correspond to a portable beeper/pager. The microprocessor has a sophisticated time delay algorithm for use on initial start-up. The system also monitors the battery power of the vehicle and indicates a low power situation, the system sets off an alarm utilizing a power saving algorithm to enable notification to the handler before the battery power is completely exhausted.

Accordingly, it is an objective of this invention to provide an alarm system that correlates temperature data from different locations in the vehicle to arrive at an average of the ambient temperature. The alarm threshold is set to the average ambient temperature, and also an individual sensor temperature threshold.

It is a further objective of this invention to provide an alarm system with a sophisticated time delay algorithm to allow vehicle cooling after initial start-up.

Another objective is to provide monitoring of temperature sensors and other alarm condition detectors to determine proper operation, if a failure is found the alarm system displays the failure and notifies the handler away from the vehicle.

Still another objective is to provide a system that utilizes non-volatile memory, therefore all temperature alarm thresholds and feature settings are retained even if system power is interrupted or lost.

It is another objective of this invention to provide an alarm system that includes visual read-outs which show the temperature of each sensor.

A further objective of this invention is to provide a control head connected to each sensor and to certain components of the vehicle through the electrical system of the vehicle. The control head includes switching to energize such components as a K9 ventilation fan, the horn, the emergency lights (police emergency lights), the siren, electric windows either sequentially, simultaneously or as programmed, and optionally the engine.

Yet another objective of this invention is to provide the control head with capability to electronically send signals to a portable device carried by the operator of the vehicle.

A still further objective of this invention is to provide a vehicle battery monitor to signal a low voltage situation.

Another objective of the invention is to include auxiliary alarm inputs to detect smoke and/or carbon monoxide.

Yet still another objective of the invention is to interface to a police radio to announce by voice or data of a K9 alarm condition. Such an objective will enable the notification of the alarm condition to a dispatcher, other officers and the K9 handler if the handler is carrying a portable police radio.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

SHORT DESCRIPTION OF THE DRAWINGS

FIG. 1 is a diagram of the multiple sensor heat alarm system of this invention.

DETAILED DESCRIPTION OF THE INVENTION

The multiple sensor heat alarm system 10 has a control head 11 and temperature sensors 12 and 13 connected by wires 14 and 15. The control head is connected to the vehicle electrical system. The circuit includes the vehicle battery 16 so that the system has power at all times. A battery pack separate from the vehicle electrical system can be used, if desired, both as an automatic back-up during periods of low vehicle battery power or to energize the system 10 totally. There is a manual ON-OFF switch 17 to disable the system and prevent draining battery power.

The system 10 has a microprocessor 18 such as, for example only, model PIC16F87X microcontroller marketed by Microchip Technology, Inc. Of course, other microprocessors may be used in the system. The microprocessor 18 is programmable and is set by the user to a desired alarm temperature threshold. The microprocessor may also be programmed to activate the different vehicle components and installed alert options to notify the operator that the average temperature is above the alarm threshold.

The control head 11 has a microprocessor 18 that receives the data from the temperature sensors 12 and 13 and decodes the data to present a visual display of the temperatures at the sensors. The temperature sensors are placed in or near the containment area of a K 9 vehicle in such locations that both will not normally be subject to the same temperature level. The display shows both temperatures with a resolution of 0.1 degree F. The microprocessor also averages, ie., totals the data inputs and divides by the total number of temperature sensors, and can simultaneously present the average as a third temperature display. As the sun strikes the vehicle at various angles, the vehicle will have natural hot spots which could activate the alarm prematurely. The average temperature gives a much more accurate sensing of the overall ambient temperature inside the vehicle. The average is used by the microprocessor as the data to drive the system and initiate the alarm sequence.

As an example of the algorithm used when temperature averaging is enabled, the alarm threshold is set at 90 degrees F. of the multiple sensor average and is also set to 100 degrees F. of each individual temperature sensor. This significantly reduces false alarms, while still monitoring for an extreme temperature.

The temperature sensors 12 and 13 are digital thermometers, such as model DS18S20, High Precision 1-Wire Digital Thermometer, marketed by Dallas Semiconductor. Of course, other digital and analog thermometers could be used in the system. The sensors can be powered by the data line within the range of 3.0V to 5.5V. The sensors can measure temperatures with a ±0.5 degree C. accuracy from −10 to 85 degrees C. Non-volatile user defined alarm settings can be programmed for addressing the microprocessor when the temperature is outside programmed limits. Using this system, one, two or more sensors can be used with one microprocessor. The microprocessor uses a software algorithm that doubles the accuracy of the digital temperature sensor. If more than two sensors are placed in the system the averaging will include all the temperature readings. The sensors are placed in the vehicle in locations that will not usually be, simultaneously, in a hot spot or direct sunlight. The sensors are connected to a cable or data line that may be about 15 feet in length. The temperature sensor is housed in a custom designed brass enclosure thus making it much less likely to be damaged by the contained canine, or other animal, while allowing it to be placed in close proximity for accurate temperature measurement.

The system has a self test function to monitor each sensor and the associated wiring and connections. Any fault or failure may be displayed as well as activating an alarm, as programmed. An alarm is activated by a sensor failure.

Additionally, the system has a vehicle battery sentinel mode. The programming of the microprocessor includes an algorithm monitoring the vehicle battery voltage over time to determine if the voltage is dropping at a certain rate and exceeds a preset limit, it will issue a full alarm response for a short period of time, such as 15 seconds. The period of time is sufficient for lowering the windows 19 or the execution of the slowest alarm function. The full alarm response activates all the alarm devices, including the remote beeper/pager 21 via a beeper/pager transmitter 20 located in the vehicle. After the short activation, the system shuts down all the alarm devices, except the beeper/pager transmitter 20, to conserve battery power. After a predetermined rest period, another full alarm response is activated. This sequence of short alarms and shut-downs continue until manually stopped or power levels are restored. The limit may be set at a level to assure enough battery power to start the vehicle engine.

The output of the microprocessor 18 includes a display in the control head such as digital LCD or analog readouts of all temperature sensors. The preset temperature threshold for activation of the alarm may also shown. The system may have its own aural and/or visual alarm, in the control head, activated by the microprocessor. Displays other than numeric may be used such as bar graphs and an adjustable red line for the alarm threshold temperature.

In addition, the system may have a RF transmitter 20 or beeper/transmitter 20 and a small portable receiver or remote beeper/pager 21 to be carried by the operator of the vehicle. The microprocessor is programmed to send a signal to the beeper/pager 21 via the beeper/pager transmitter 20 when the temperature alarm threshold is exceeded. Or the system may have a transmitter/receiver 20 in the control head, controlled by the microprocessor, to send and receive a signal or data when the temperature is excessive or information about the alarm system or vehicle or data to and from a remote two-way beeper/pager or device 21. The remote two-way beeper/pager or device 21 could send a return signal to the microprocessor to stop the alarm or perform some additional function, such as opening the windows or doors. This permits the operator to stop the alarm in the event he is immediately returning to the vehicle or, in case he is detained, to otherwise control the temperature in the vehicle.

Further, the microprocessor 18 may be programmed to track the operation of the vehicle engine 22. In some situations, the handler may leave the vehicle engine running to maintain a healthy temperature and, in the event the engine stalls or stops running, the microprocessor may send an alarm command. The alarm command may activate the vehicle components or the remote beeper/pager 21 or both. Also, the system can have the ability to start the vehicle engine 22 to operate the air conditioning unit upon reception of a remote signal.

The use of an interactive beeper/pager signal device 21 may roll down or unlock and unlatch a window(s) 19 or door(s) 23 to permit a trained animal to escape the vehicle.

The remote beeper/pager 21 has one button 24 to initiate the unlock/unlatch sequence to avoid confusion in a high stress situation. The microprocessor controls the timing of the unlock/unlatch sequence to avoid destructive heat build-up in the door solenoid (not shown) in the event the operator holds the button down. The microprocessor 18 controls the signal to the solenoid that is interfaced with the doorjamb mechanism of the vehicle and mimics the action of the door handle. For example, after receiving a remote signal the microprocessor is programmed to send power to the door lock/unlock motor; pause; send power to unlatch solenoid; pause; send power to unlatch solenoid; pause; repeat sequence if remote signal is received; if no remote signal stop.

The output can be integrated with other vehicle components, such as a fan 25, the horn 26, the lights 27, the light bar 28, in a police or emergency vehicle, the windows 19, and the engine 22. These components may be energized by an alarm signal from the microprocessor 18. The microprocessor may be programmed to activate the horn and/or lights in a particular sequence or tone to attract the operators attention.

Unique to this invention is the use of the microprocessor to activate the horn and/or lights in a particular sequence or tone to attract the operators attention. For instance, the Morse code SOS can be utilized to give an emergency signal with horn or lights.

The microprocessor 18 has a delay built into the alarm circuit which is operative upon initial activation of the system. Initial activation of the system may be the use of the manual OFF/ON switch 17 or the system may have a connection to the ignition system to receive an indication that the engine has been started. The delay prevents the alarm(s) from being automatically activated when the vehicle is started after being vacant and the temperature being above the alarm threshold. The delay allows time for the air conditioner and/or open windows to dissipate the ambient heat before the alarm is activated. The amount of time in the delay may be programmed depending on the locale.

The delay has two modes. An auto mode is programmed in the starting sequence. For example, the auto mode may have a 3 minute time limit. During this auto cycle, the system may emit an aural signal and a flashing pre-alarm visual warning in the display. An aural signal and the visual display change will indicate if at the end of the 3 minute period the temperature is still above the alarm threshold. If the operator determines that the vehicles interior temperature is decreasing but requires more time, the operator may initiate an additional 3 minute delay. This manual mode reset restarts the timer for another 3 minutes however, the number of manual resets is limited to only a few times. If the vehicle is vacant or the operator takes no action and the interior temperature is still above the alarm threshold, the microprocessor will go into the alarm mode. Most often, the system is setup to be powered ON when the vehicle's ignition is ON and powered OFF when the ignition is OFF. This is the "active setup" whereas the operator will leave the engine running and the A/C ON to maintain a cool environment when he/she leaves the animal unattended in the vehicle. In this setup the operator is not required to remember to enable or disable the alarm system. However, in more moderate climates the system may be setup to be left powered ON even if the ignition is OFF. This is a "passive setup" whereas the operator may leave the animal in the vehicle unattended WITHOUT leaving the engine running and the A/C ON thus actively maintaining a cool interior of the vehicle. This is done in moderate climates usually with the windows down to passively ventilate the animal. Of course, a strong window screen or other cage system is used to keep the animal contained within the vehicle. If while the operator is away the climate changes or the sun's effective radiance changes in a way that the passive ventilation can not dissipate the heat within the vehicle, the alarm system senses the interior heat rise and activates the various alert systems.

Once the system is placed in a vehicle and is operative, the alarms will function whether or not there is an occupant in the vehicle. The manual heat sensor system switch is important to inactivate the system for an empty vehicle. The preferred embodiment is installed to be automatically energized unless manually turned off because it was found that if the system required manual activation, the activation of the system was overlooked too often.

The system can be installed in any vehicle with an electrical system, such as cars, vans, trucks, ambulances, buses, etc., and the occupants may include those species deleteriously affected by a high ambient temperature.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

What is claimed is:

1. In a system for signaling a higher than preset interior temperature of a vehicle having a battery including temperature sensors in the vehicle and a control head which activates an alarm when a preset temperature is exceeded, said alarm including activation of one or more of a group of vehicle components consisting of the horn, siren, emergency lights, or headlights, the improvement comprising said control head having a microprocessor connected to said at least two temperature sensors, said temperature sensors widely dispersed in the passenger areas of said vehicle, each of said temperature sensors sending local temperature data to said microprocessor, said microprocessor including algorithms operable to:
   compute an average of said temperature data from said at least two temperature sensors, compare said average with said preset temperature and activate said alarm when said average exceeds said preset temperature
   continuously monitor the vehicle battery voltage to determine if a negative rate of change in vehicle battery voltage exists and activating said alarm if said rate exceeds a preset limit, and
   monitoring each sensor to detect failure in operation, and activating said alarm in the event of sensor failure.

2. In a system of claim 1, the improvement including a visual display connected to said microprocessor, said visual display mounted in said control head and indicating the temperature at each sensor.

3. In a system of claim 1, the improvement including a automatic time delay in said microprocessor, said time delay active on initial start up of said vehicle to delay activating said one of said group of vehicle components for a period of time to allow the temperature in said vehicle to reach said preset temperature.

4. In a system of claim 3, the improvement including a manual time delay in said control head connected to said microprocessor to restart said automatic time delay to provide additional time to allow the temperature in the vehicle to reach said preset temperature.

5. In a system of claim 1, the improvement including an electronic signaling means in said control head to correspond to a portable electronic unit to indicate that said preset temperature has been exceeded.

6. In a system of claim 5, the improvement including a signaling means in said portable electronic unit to signal said control head to interrupt said activation of said one of said group of vehicle components.

7. In a system of claim 5, the improvement including a signaling means in said portable electronic unit to activate one of said group of vehicle components.

8. In a system of claim 1, the improvement including said microprocessor monitoring the operation of the engine of the vehicle, an electronic signaling means in said control head to correspond to a portable electronic unit to indicate that the engine is inoperative.

9. In a system of claim 1, the improvement including said microprocessor monitoring the power status of the battery of the vehicle, an electronic signaling means in said control head to correspond to a portable electronic unit to indicate that said battery power is below a set limit.

10. In a system of claim 1, the improvement including an electronic signaling means in said control head corresponding to a portable electronic device, said device having means to correspond with said control head for activating one of said group of vehicle components.

11. In a system of claim 10, the improvement including a signaling means in said portable electronic unit to signal said control head to interrupt said activation of said one of said group of vehicle components.

12. An alarm system for installation in a passenger compartment of a vehicle to indicate the existence of an unhealthy temperature, said system comprising at least two temperature sensors, said at least two sensors adapted to be placed in the vehicle in a widely dispersed arrangement inside the passenger compartment and a microprocessor connected to said at least two sensors, said microprocessor programmed with a temperature alarm threshold, said microprocessor programmed to compute an average of said temperature data from said at least two temperature sensors, compare said average with said temperature alarm threshold and issue an alarm command adapted to energize vehicle components to emit visual and aural signals when said alarm threshold is exceeded, said microprocessor having a programmed time delay mode, said programmed time delay mode preventing an immediate command upon initial activation of the system when the vehicle temperature exceeds said alarm threshold.

13. An alarm system of claim 12 wherein said time delay mode issues a pre-alarm command after a preset time interval from initial activation, said pre-alarm command indicates temperature remains above said alarm threshold, said pre-alarm command includes an additional time period, at the end of said time delay mode said microprocessor issues an alarm command.

14. An alarm system of claim 12 wherein said time delay mode includes a manual reset, said system having a manual switch connected to said microprocessor, said switch restarting said time delay mode upon activation.

15. An alarm system of claim 12 wherein said microprocessor is programmed to issue an alarm command adapted to energize vehicle components to introduce ambient air when said alarm threshold is exceeded.

16. An alarm system of claim 12 wherein said microprocessor issues said alarm command by electronic signal to a portable device, said portable device indicating an alarm command has been received.

17. An alarm system of claim 16 wherein said portable device corresponds with said microprocessor to activate a vehicle component.

18. An alarm system for installation in a passenger compartment of a vehicle to indicate the existence of an unhealthy temperature, said system comprising at least two temperature sensors, said at least two temperatures sensors adapted to be placed in the vehicle in a widely dispersed arrangement inside the passenger compartment, and a microprocessor, connected to said at least two temperature sensors, said microprocessor programmed to compute an average of said temperature data from said at least two temperature sensors and compare said average with a temperature alarm threshold, said microprocessor programmed to issue an alarm command adapted to energize vehicle components to emit visual and aural signals when said average exceeds said temperature alarm threshold, said microprocessor programmed with a battery sentinel mode, said battery sentinel mode adapted to monitor the vehicle battery voltage over time to determine rate of voltage drop, said mode initiating a sequence when said voltage drop exceeds a preset limit, said microprocessor in said battery sentinel mode issues an alarm command of short duration, said sentinel mode includes a rest period to conserve battery power, said microprocessor in said battery sentinel mode repeats said alarm command of short duration, said battery sentinel mode repeats this sequence until power is restored.

19. An alarm system of claim 18 wherein said microprocessor in said battery sentinel mode issues said alarm command by electronic signal to a portable device, said portable device indicating an alarm command has been received, said battery sentinel mode continuously signals said portable device during said rest period.

20. An alarm system of claim 19 wherein said portable device corresponds with said microprocessor to activate a vehicle component.

21. An alarm system of claim 18, wherein said alarm command further comprises opening the windows of the vehicle.

* * * * *